United States Patent [19]

Boakes et al.

[11] Patent Number: 5,386,460
[45] Date of Patent: Jan. 31, 1995

[54] FEATURE CONFIGURABLE TELEPHONE TERMINAL

[75] Inventors: Edward W. Boakes, Middletown; Kathleen J. Chylinski, Bridgewater; Susan L. Tuttle, East Windsor, all of N.J.

[73] Assignee: AT&T Corp., Murray Hill, N.J.

[21] Appl. No.: 426

[22] Filed: Jan. 4, 1993

[51] Int. Cl.⁶ .................. H04M 1/56; H04M 1/27; G09G 3/20
[52] U.S. Cl. .................. 379/96; 379/110; 379/142; 379/356; 379/368; 345/172; 345/902
[58] Field of Search ............ 379/355, 356, 357, 368, 379/387, 388, 389, 396, 201, 96, 110, 111, 142; 345/123, 124, 130, 146, 168, 169, 172, 902, 903

[56] References Cited

U.S. PATENT DOCUMENTS

| | | | |
|---|---|---|---|
| 4,425,627 | 1/1984 | Eibner | 379/388 |
| 4,503,288 | 3/1985 | Kessler | 379/357 |
| 4,506,346 | 3/1985 | Bennett et al. | 364/900 |
| 4,680,729 | 7/1987 | Steinhart | 345/172 |
| 4,788,720 | 11/1988 | Brennan et al. | 379/201 |
| 4,817,127 | 3/1989 | Chamberlin et al. | 379/110 |
| 4,823,311 | 4/1989 | Hunter et al. | 345/172 |
| 4,885,580 | 12/1989 | Noto et al. | 379/396 |
| 4,897,866 | 1/1990 | Majmudar et al. | 379/396 |
| 4,908,845 | 3/1990 | Little | 379/355 |
| 4,991,199 | 2/1991 | Parekh et al. | 379/96 |
| 5,119,413 | 6/1992 | Okumura et al. | 379/156 |
| 5,303,301 | 4/1994 | Takahata | 379/142 |

OTHER PUBLICATIONS

Canon Navigator Desktop Office "The Worlds First Desktop Office is Here" Canon Inc. 1990; Dec. 30, 1992 Pub.5-CE-059; 05905280.

Primary Examiner—James L. Dwyer
Assistant Examiner—Scott L. Weaver
Attorney, Agent, or Firm—Samuel R. Williamson

[57] ABSTRACT

A telephone terminal is configurable by a user to contain just those features desired by the user. Although equipped with a full set of available features, the terminal also is initially configured only with a minimum default set of features directly and easily accessible by a user. The user is able to reconfigure the telephone terminal for selectively adding features when he or she desired more capabilities.

10 Claims, 3 Drawing Sheets

FEATURE CONFIGURABLE TELEPHONE TERMINAL

BACKGROUND OF THE INVENTION

1. Technical Field

This invention is directed to telephone terminals and more particularly, to a telephone terminal configurable by a user for accessing features available on a telephone terminal through an interactive display arrangement.

2. Description of the Prior Art

Telephone terminals that contain user interactive displays and enable a user to access local and network-based features and also execute local and network-based commands at the telephone terminal are now becoming popular. In such high function terminals, the number of features or commands available for selection by the user is determined by the terminal designer at the time of manufacture of the terminal.

A manufacturer may offer the telephone terminal with a simplistic set of features, which facilitate ease of use. The manufacturer also may offer the terminal with a complex set of features so that the terminal incorporates all of the possible particulars that the manufacturer anticipates a customer might want. In either case, the manufacturer offers the features only in a fixed-feature sized package in each telephone terminal.

Some customers may become frustrated by the lack of a full set of features on the telephone terminal whereas other customers may find a full set of features so complicated that these customers may not be able to easily access and use those basic features provided on the telephone terminal. It is desirable, therefore, that a user of a terminal be able to gain access to and use any desired features on the telephone terminal while, at the same time, avoiding undue confusion by not being able to inadvertently access any undesired features also on the terminal.

SUMMARY OF THE INVENTION

The prior art problems are solved in accordance with the present invention by providing a telephone terminal that is configurable by a user to contain just those features desired by the user. The terminal is initially configured with a minimum default feature set directly accessible by a user. In preferred embodiments, the user is able to reconfigure the telephone terminal for selecting additional features when he or she desired more capabilities.

In accordance with an aspect of the invention, the features available at the telephone terminal are separated into modules and the module most likely to be used by a customer is provided as the default feature set in the telephone terminal. A user may selectively add features up to the entire set of available features on the terminal as desired. Any portion of a module, including the default module, may be deactivated by the user if desired.

BRIEF DESCRIPTION OF THE DRAWINGS

This invention and its mode of operation will be more clearly understood from the following detailed description when read with the appended drawing in which:

Referring now to FIG. 1, there is shown an illustrative block diagram of a telephone terminal 100 useful for describing the operation of the present invention. The terminal includes an input/output (I/O) interface unit 110 which connects to a telecommunication switch 111, such as the 5ESS ® central office (CO) switch or the DEFINITY ® private branch exchange (PBX) switch, via lines 101. This I/O interface unit 110 contains switching, control, and line circuits required by the terminal 100 for establishing, maintaining and terminating communication connections between the terminal and the CO or PBX switch 111. Through these circuits, the terminal 100 thus sends to and receives from the CO or PBX switch 111 switching and control signals.

Figure 1:
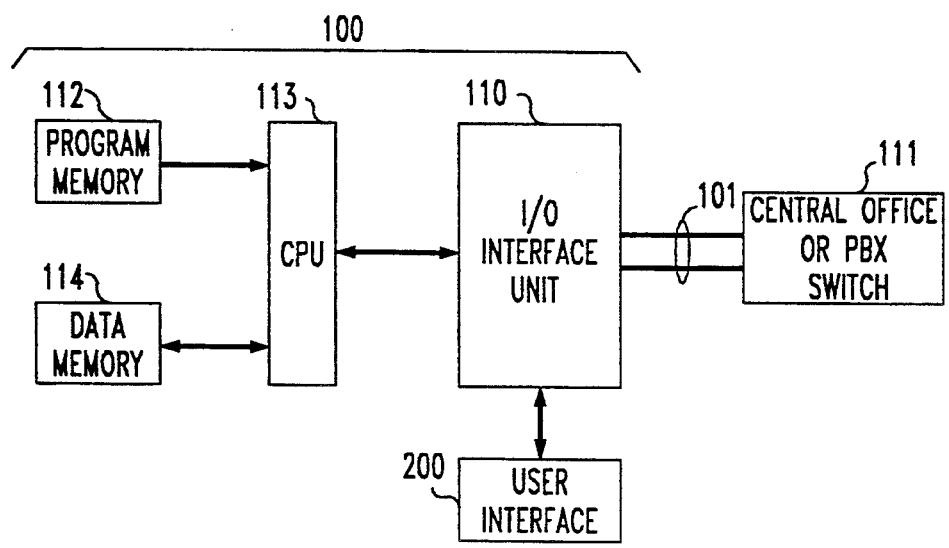
FIG. 1 is a block diagram of a telephone terminal useful in describing the present invention.

The terminal also includes a program memory 112 which provides instructions to a central processor unit (CPU) 113 for controlling the various operating features and functions originating at the terminal. This program memory 112 also contains data for interpreting a plurality of codes representative of various network information received from the switch 111 and for generating codes to be transmitted to the switch 111. A data memory 114 is utilized by the CPU 113 for storing and accessing data associated with performing the various functions and features programmed in the program memory 112. In one embodiment, CPU 113 is a microprocessor, program memory 112 is read-only-memory (ROM) and data memory 114 is a random-access-memory (RAM). These components are readily available from a number of semiconductor manufacturers such as Intel, Motorola, AMD and NEC. Connected to the interface unit 110 is a user interface 200, the physical aspects of which are shown in greater detail in FIG. 2.

Figure 2:
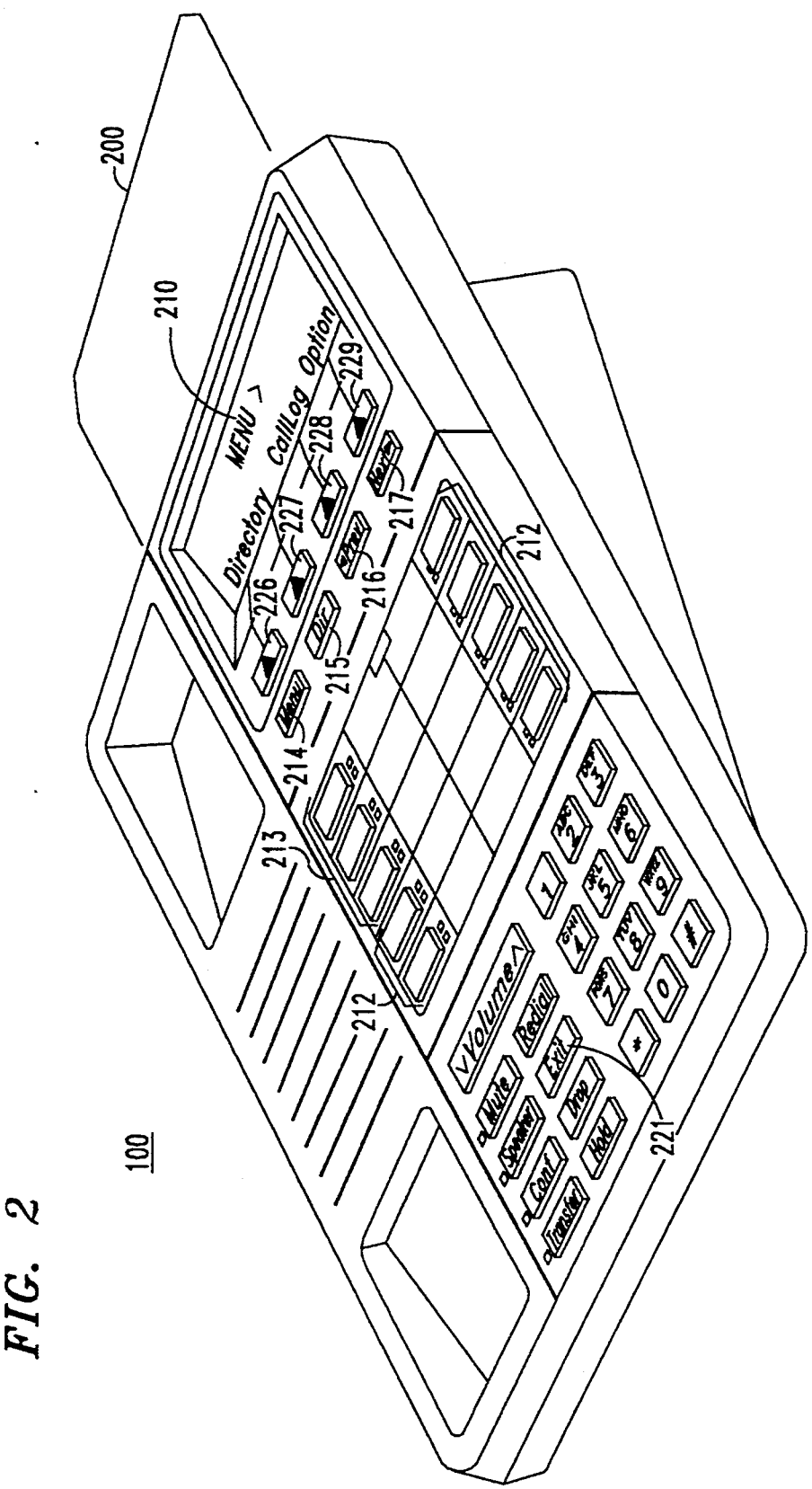
FIG. 2 illustrates the telephone terminal of FIG. 1 including a user interactive display with a first display message, in accordance with the present invention.
Figure 4:
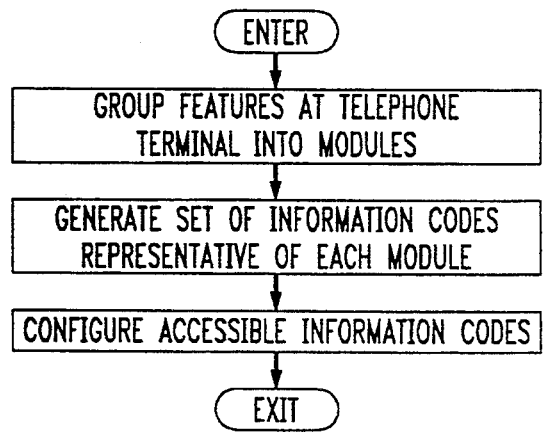
FIG. 4 is a flow diagram illustrating the grouping of features at the telephone terminal into modules.
Figure 5:
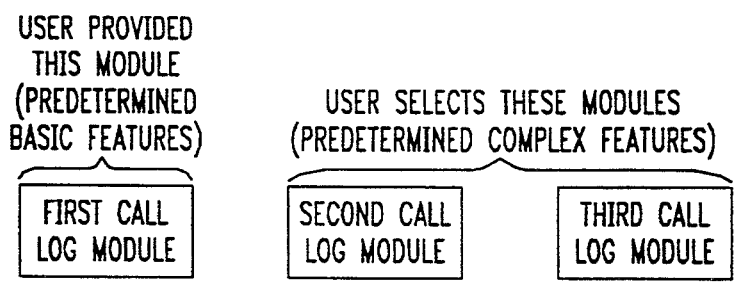
FIG. 5 is an illustration of the modules that are stored in memory of the telephone terminal shown in FIG. 1.
Figure 6:
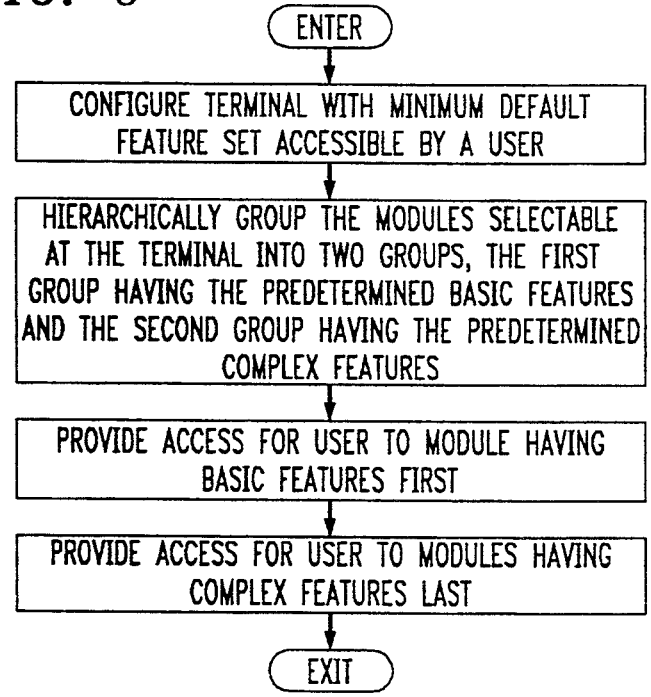
FIG. 6 is a flow diagram illustrating the process of grouping the modules of FIG. 5 into a hierarchical group.

With reference to FIG. 2, and in accordance with the invention, the user interface 200 allows the user of the telephone terminal 100 to configure the telephone terminal for selecting those available features that are desired by the user to be assessible at the terminal.

The user interface 200 comprises a user interactive display 210, switch administered keys or buttons 212, call appearance keys or buttons 213, multiple hard keys 214 through 217, an "Exit" key 221 and softkeys 226 through 229. Other well-known keys or buttons are also illustrated as part of the telephone terminal shown in FIG. 2 but are not further described herein.

The multiple hard buttons 214 through 217 are respectively labeled "Menu", "Dir", "<Prev", and "Next>". The Menu button 214 is used to configure the terminal to the local softkey state, to be described in greater detail later herein with reference to FIG. 3. Similarly, the Dir button 215 also configures the terminal to the local softkey state, and also gives the user quick access to a local directory stored in the terminal with the first few entries appearing on the display. The <Prev and Next> buttons 216 and 217 are used to access additional menu items in both the local softkey state and in a network-based or switch feature state. In the local softkey state, for example, names and telephone numbers may be accessed by these buttons for entering or editing with the softkeys 226 through 229. Also the next button 217 could be used in the switch feature state, for example, to display the next entry in the directory query feature.

The labels and functions of the softkeys 226 through 229 appear on the associated display 210. The label or function for each of these keys changes dynamically as the user performs functions and makes selections via these softkeys.

While the embodiment of the present invention is described as being incorporated into a telephone terminal, it should be recognized that the present command-operated terminal could be utilized in a computer or other program-controlled system. Since such systems utilize a variety of hardware and programming techniques, no attempt is made to describe the details of the program used to control the telephone terminal. However, the present invention must be blended into the overall structure of the system in which it is used and must be tailored to mesh with other features and operations of the system. Thus, in order to avoid confusion and in order to enable those skilled in the an to practice the claimed invention, this specification describes the operation of the present invention using the telephone terminal 100 shown in both FIGS. 1 and 2 together with the interactive display 210 of FIG. 2, and the interactive display 210' of FIG. 3, which, taken together, describe the logical steps and the various parameters required to implement the present invention.

A telephone terminal that is configurable by a user to contain just those features desired by the user is provided in accordance with the present invention. The terminal is initially configured with a minimum default feature set directly accessible by a user. The user is able to reconfigure the telephone terminal for selecting additional features when he or she desired more capabilities.

The features available at the telephone terminal are organized as separate modules and the module most likely to be used by a customer is provided as the default feature set in the telephone terminal. A user may selectively add features up to the entire set of available features on the terminal as desired. Portions of a module, including portions of the default module, may be deactivated by the user if desired.

One such module available in the telephone terminal is a call log module which provide certain basic features. The customer may want to modify the features available in this module over time. By way of an illustrative example, when a customer receives a newly installed telephone terminal at his or her desk, the call log module will have only the Unanswered Call Log feature activated. This feature keeps track of the ten most recent unanswered incoming calls. The call information collected on these incoming unanswered calls may be viewed on the interactive display 210 shown in FIG. 2 by a user who simply presses the softkey button 228, which selects the call log module.

In addition to being able to store the 10 most recent unanswered incoming calls, the call log module also is capable of storing the 10 most recent answered incoming calls and the 10 most recent calls that were placed at the telephone terminal.

After a user becomes familiar with the CallLog feature, the user may elect to have the other available calls logged. This modification of the call log module is achieved by pressing the option label, softkey button 229, shown in the menu display 210. From this option menu, the user may select the calllog option and then modify the call log module such that it stores not only the 10 most recent unanswered incoming calls, but also the 10 most recent answered incoming calls and the 10 most recent calls that were placed at the telephone terminal.

Figure 3:
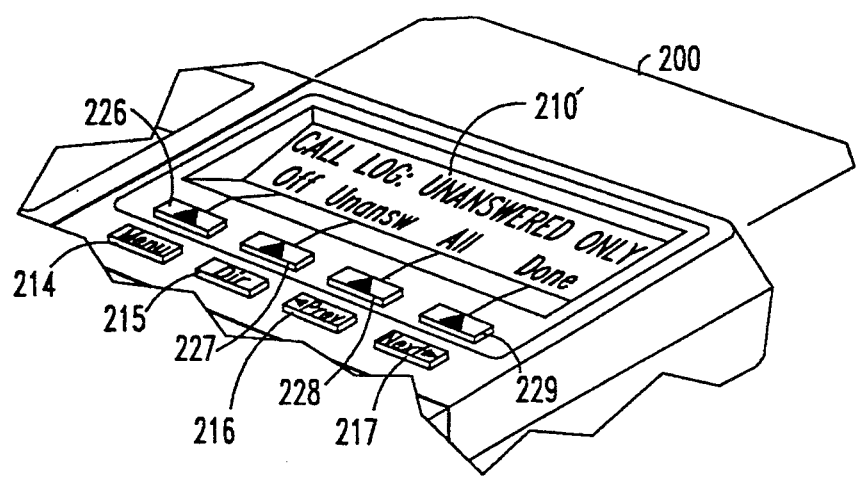
FIG. 3 is a partial illustration of the telephone terminal of FIG. 2 further illustrating the user interactive display with a second display message, in accordance with the present invention.

The selection choices for the call log module are illustrated in the display 210' of FIG. 3. These choices are "Off", "Unansw" (unanswered) and "All" and are shown in the bottom line of the display 210'. The option that has been selected and is active in the terminal is shown in the fight portion of the top line in the display 210'. If the user decides that privacy is more important than the information providable by the call log module, the features within the call log module may be turned off by pressing the softkey button 226 and selecting the menu Off feature.

If the call log module is turned Off, the label CallLog on the main menu of display 210 will not appear. If the label CallLog does appear on the main menu, then this is an indication that the call log module is set to respond to either unanswered calls only or to all calls.

In the operation of the call log module, when the CallLog is set to unanswered calls only and the user selects the Call log module by depressing the softkey button 228, which corresponds to the CallLog label in the menu of display 210, the display goes right into the unanswered call information. When the CallLog is set to All calls and the user selects the call log module, the user must choose which of the three category of calls, unanswered Incoming, answered Incoming, and Outgoing, is to be viewed. The first choices are Incoming or Outgoing calls. If the user chooses Outgoing, then the display goes directly into and begins displaying the outgoing call information. If the user chooses Incoming, then the user must make a second selection of unanswered or answered calls in order to view the information.

In addition to having the terminal select the types of calls that the user wants recorded, the user also may elect to have the terminal provide information indicating how many new unanswered incoming calls have been recorded in the log since the log was last viewed on the display 210 when a time and date screen are shown.

What has been described is merely illustrative of the present invention. Other applications to telephone, computer or other user interactive systems other than the disclosed system are contemplated as being within the knowledge of one skilled in the art and may be utilized without departing from the spirit and scope of the present invention.

We claim:

1. A method of configuring a telephone terminal for accessing selectable features at the telephone terminal, the method comprising the steps of:

grouping features available at the telephone terminal into separate modules stored in memory in the telephone terminal and selectable by a user at the telephone terminal;

retrieving from memory a set of information codes for presenting on the telephone terminal, the information codes being representative of each module selectable at the telephone terminal;

configuring selected information codes to be accessible in response to actuating an associated local switch;

providing access at the telephone terminal only to the features corresponding to the selected information codes; and configuring the telephone terminal with a first module, this first module comprising a call log module which includes a set of predetermined basic features available at the telephone terminal, said basic features being directly accessed in response to a single actuation of said associated local switch.

2. The method of claim 1 further comprising the step of hierarchically grouping the modules selectable at the telephone terminal, the first module corresponding to the basic features being accessible first in the hierarchical grouping and remaining modules corresponding to predetermined complex features being accessible last in the hierarchical grouping, said complex features being accessed in response to sequentially actuating associated local switches.

3. An arrangement for configuring a telephone terminal for accessing selectable features at the telephone terminal, the arrangement comprising:

means for grouping features available at the telephone terminal into separate modules stored in a memory in the telephone terminal and selectable by a user at the telephone terminal;

means for retrieving from the memory a set of information codes for presenting on the telephone terminal, the information codes being representative of each module selectable at the telephone terminal;

means for configuring selected information codes to be accessible in response to actuating an associated local switch;

means for providing access at the telephone terminal only to features corresponding to the selected information codes; and means for initially, configuring the telephone terminal with a first module, this first module comprising a call log module which includes a set of predetermined basic features available at the telephone terminal, said basic features being directly accessed in response to a single actuation of said associated local switch.

4. The arrangement of claim 3 further comprising means for hierarchically grouping the modules selectable at the telephone terminal, the first module corresponding to the basic features being accessible first in remaining hierarchical grouping and the modules corresponding to predetermined complex features being accessible last in the hierarchical grouping, said complex features being accessed in response to sequentially actuating associated local switches.

5. The arrangement of claim 4 wherein the first module stores call information corresponding to a predetermined number of recent unanswered incoming calls received at the telephone terminal.

6. The method of claim 2 wherein the first module stores call information corresponding to a predetermined number of recent unanswered incoming calls received at the telephone terminal.

7. The arrangement of claim 5 further including a second module, said second module comprising a call log module for storing call information corresponding to a predetermined number of recent incoming calls answered at the telephone terminal.

8. The arrangement of claim 7 further including a third module, said third module comprising a call log module for storing call information corresponding to a predetermined number of recent calls that were placed at the telephone terminal.

9. The method of claim 6 further including a second module, said second module comprising a call log module for storing call information corresponding to a predetermined number of recent incoming calls answered at the telephone terminal.

10. The method of claim 9 further including a third module, said third module comprising a call log module for storing call information corresponding to a predetermined number of recent calls that were placed at the telephone terminal.

* * * * *